3,262,895
CHLOROACRYLATE POLYMERS CONTAINING
METAL SALTS OF FATTY ACIDS
Harry D. Anspon, Kansas City, Mo., assignor to General
Aniline & Film Corporation, New York, N.Y., a corporation of Delaware
No Drawing. Filed Apr. 9, 1962, Ser. No. 185,809
6 Claims. (Cl. 260—23)

This invention relates to new and useful compositions of matter comprising esters of α-chloroacrylic acid and alkaline earth metal salts of higher fatty acids and in particular to compositions comprising lower alkyl esters of α-chloroacrylic acid and alkaline earth metal salts of fatty acids of from about 12 to 18 carbon atoms having outstanding stability and lubricating characteristics.

It is well known that polymeric esters of α-chloroacrylic acid undergo foaming and expansion when heated to an elevated temperature. In contradistinction to other polymers which have heretofore been employed in the production of foamed products, it is possible to form poly-α-chloroacrylates without resorting to the use of blowing agents or the like. The α-chloroacrylate polymers foam exceedingly well whether they are used as a clear product in the absence of filler or in the presence of numerous filler additives. In copending application Serial No. 755,137, filed Aug. 15, 1958, now abandoned, the use of silica powder of a particle size below about 5 microns is disclosed as admirably suited as a filler for the production of foamed products from chloroacrylate polymers and the particular advantage of this filler lies in the fact that it can be used to gel the monomer, easily and safely handled thereafter and then polymerized, the filler in no way adversely affecting the polymerization process. In the aforementioned copending application it was indeed surprising that the silica did not interfere with the polymerization in view of the known difficulties attendant with the formation of polymers from the precursor monomers and the known requirements of utmost purity to produce a satisfactory polymer product.

It has now been discovered that alkaline earth salts of the higher fatty acids may be used also as gelling agents for chloroacrylate monomers to facilitate their handling, and such salts also do not interfere with the polymerization procedure. Contrary, however, to the results obtained in the procedures described in the aforementioned copending application, the use of alkaline earth salts of the fatty acids in combination with the subject monomers produces a polymer product which not only has outstanding lubricating properties but surprisingly, the resultant polymer product does not foam when heated to elevated temperatures. This is a decided plus factor for such compositions since the various uses contemplated, such as bearings and the like, are usually attendant with elevated temperatures and foaming in such instances could not be tolerated.

It is therefore an object of this invention to provide new and useful lubricating compositions comprising α-chloroacrylic acid esters in polymer form.

It is another object of the present invention to provide new and useful compositions of α-chloroacrylic acid ester monomers which can be gelled and safely handled and thereafter polymerized to lubricating materials.

It is still another object of this invention to provide new and useful lubricating compositions comprising polymers of α-chloroacrylic acid esters and in particular methyl-α-chloroacrylate and alkaline earth salts of higher fatty acids.

It is still a further object of the present invention to provide compositions of α-chloroacrylic acid ester polymers which do not foam.

Other objects will appear hereinafter as the description proceeds.

Among the esters of α-chloroacrylic acid which may be used in preparing the compositions of the present invention mention may be made of the following:

Methyl
Ethyl
n-Propyl
Isopropyl
Isobutyl
n-Butyl
Isoamyl
n-Hexyl
Isooctyl
Lauryl
Allyl
Methallyl
Crotyl
Cyclohexyl
Methyl cyclohexyl
Benzyl
Phenyl
Tolyl
Tetrahydrofurfuryl and the like.

The alkaline earth salts of the higher fatty acids which are contemplated in this invention include the salts of fatty acids having a carbon atom chain of from 12 to 18 carbon atoms and the metals include the group characterized as the alkaline earth metals and particularly magnesium, calcium, strontium and barium. The fatty acids include not only the saturated acids, but also the mono unsaturated acids, e.g., oleic acid and the like.

The following examples will serve to illustrate the present invention without being deemed limitative thereof.

*Example 1*

A charge of the following ingredients is placed into a 1 inch diameter tube sealed at the bottom and after charging, sealed at the top:

250 ml. methyl-α-chloroacrylate;
50 g. magnesium stearate;
0.115 ml. dibutyl tin diacetate.

The mixture is a milky slurry which is held at room temperature for 24 hours. It is then cured in an oven employing the following temperature-time sequence:
  4 hrs. at 60° C.
  16 hrs. at 100° C.
  3 hrs. at 160° C.
The result is a hard, opaque, very slippery polymer. The product is then heated for 8 hrs. at 175° C. without any noticeable change in the properties. A similar heat treatment of the polymer in the absence of the magnesium stearate produces a foaming with a volume expansion of about 27 times that of the original sample. Employing silica in place of magnesium stearate also results in a polymer which expands about 60 times its original volume when heated at 175° C. for 8 hrs.

*Example 2*

Example 1 is repeated employing 10 g. of magnesium stearate and 40 ml. of methyl-α-chloroacrylate. The resultant polymer shows no evidence of foaming after extended heating at 175° C.

*Example 3*

Example 1 is repeated employing the following fatty acid salts:

a. Magnesium laurate
b. Magnesium oleate
c. Magnesium palmitate
d. Barium laurate
e. Barium stearate
f. Calcium stearate
g. Calcium palmitate
h. Zinc stearate
i. Zinc palmitate
j. Zinc oleate In each instance the product obtained has outstanding lubricating characteristics and does not foam upon heating at elevated temperatures as does the polymer in the absence of the indicated filler materials.

*Example 4*

A mixture of 1 g. of magnesium stearate and 3.4 ml. of methyl-α-chloroacrylate which forms a thick, viscous liquid is placed between two glass plates (a ½ in. x 4 in. x 7 in.) and the edges taped closed with Scotch tape. The mold is exposed to daylight for 96 hrs. at room temperature. After this time the mixture has polymerized to a translucent, colorless polymer sheet, the surface of which is very tough, smooth and slippery. The sheet is then further heated at 165° C. for 1 hr. No further changes are evident except that the sheet becomes more flexible. The sheet is then heated for 7 hrs. at 170° C. with no physical changes occurring, i.e., no foaming.

*Example 5*

Example 1 is again repeaed employing 10 g. of magnesium stearate (about 5% based on the weight of the monomer). At this low concentration of magnesium stearate the resultant polymer product still exhibits excellent lubricating properties.

The compositions described herein may be employed to form molded or cast objects which may be readily machined into various shapes which can be used as self-lubricating gears, rods, rams and the like. The compositions are outstanding for use in making textile thread guides. The lubricity characteristics of the compositions are excellent towards itself, other plastics, metals, glass, wood, etc.

While in the above examples in the polymerization procedure, only specific catalysts and temperature and time sequences have been described, it is evident that other catalysts well known as suitable for use with such monomers as well as other time and temperature cycles may be used. The amount of alkaline earth fatty acid salt is not critical and as little as 5% based on the weight of the chloroacrylate gives a product of outstanding lubricity characteristics. Again, the upper limit of filler is not critical but above about 40% tends to yield products of diminishing structural strength.

Other variations in and modifications of the described processes whch will be obvious to those skilled in the art can be made in this invention without departing from the scope or spirit thereof.

I claim:
1. A method for preparing a lubricating composition which comprises polymerizing methyl-α-chloroacrylate in the presence of from about 5% to about 40% by weight based on the weight of the monomer of an alkaline earth metal salt of a fatty acid having from 12 to 18 carbon atoms, said fatty acid being selected from the group consisting of saturated and monounsaturated fatty acids.
2. A method as defined in claim 1 wherein the fatty acid salt is magnesium stearate.
3. A method as defined in claim 1 wherein the fatty acid salt is zinc stearate.
4. A method as defined in claim 1 wherein the fatty acid salt is barium stearate.
5. A method as defined in claim 1 wherein the fatty acid salt is calcium stearate.
6. A method as defined in claim 1 wherein the fatty acid salt is magnesium laurate.

References Cited by the Examiner

UNITED STATES PATENTS

| | | | |
|---|---|---|---|
| 2,075,543 | 3/1937 | Reed et al. | 260—23 |
| 2,084,386 | 6/1937 | Crawford | 260—23 |
| 2,341,186 | 2/1944 | Matheson et al. | 260—23 |
| 2,467,550 | 4/1949 | Fletcher et al. | 260—23 |
| 2,485,592 | 10/1949 | Griess et al. | 260—23 |
| 2,538,297 | 1/1951 | De Nie | 260—23 |
| 2,683,705 | 7/1954 | Anspon et al. | 260—89.5 |
| 2,684,341 | 7/1954 | Anspon et al. | 260—89.5 |
| 2,752,638 | 7/1956 | Anspon | 260—89.5 |
| 2,753,314 | 7/1956 | Sevors et al. | 260—23 X |
| 2,794,791 | 6/1957 | Patton et al. | 260—23 X |

OTHER REFERENCES

Schildknecht, "Vinyl and Related Polymers," pp. 234–237, John Wiley & Sons, Inc., New York, 1952.

LEON J. BERCOVITZ, *Primary Examiner.*

T. D. KERWIN, R. A. WHITE, *Assistant Examiners.*